(12) United States Patent
Ookuma

(10) Patent No.: US 8,214,824 B2
(45) Date of Patent: Jul. 3, 2012

(54) DEVICE MANAGEMENT APPARATUS, DEVICE MANAGEMENT METHOD, AND STORAGE MEDIUM

(75) Inventor: Satoshi Ookuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 12/490,101

(22) Filed: Jun. 23, 2009

(65) Prior Publication Data

US 2010/0005462 A1    Jan. 7, 2010

(30) Foreign Application Priority Data

Jul. 1, 2008   (JP) ................................ 2008-172805

(51) Int. Cl.
*G06F 9/44* (2006.01)
(52) U.S. Cl. ........................................ 717/172; 717/177
(58) Field of Classification Search .................... None
See application file for complete search history.

(56) References Cited

U.S. PATENT DOCUMENTS

| 5,777,882 | A | * | 7/1998 | Salgado ........................ 700/214 |
| 5,857,073 | A | * | 1/1999 | Tsukamoto et al. .......... 709/208 |
| 7,177,034 | B2 | * | 2/2007 | Nakagawa et al. .......... 358/1.14 |
| 7,305,381 | B1 | * | 12/2007 | Poppink et al. ........................ 1/1 |
| 7,990,970 | B2 | * | 8/2011 | Matsuba ........................ 370/392 |
| 2003/0208560 | A1 | | 11/2003 | Inoue et al. |
| 2005/0165929 | A1 | * | 7/2005 | Motoyama .................... 709/224 |
| 2006/0012823 | A1 | * | 1/2006 | Fukuda ........................ 358/1.15 |
| 2006/0273177 | A1 | * | 12/2006 | Lee et al. ................. 235/462.01 |

FOREIGN PATENT DOCUMENTS

| JP | 2001-266257 A | 9/2001 |
| JP | 2002-010158 A | 1/2002 |

* cited by examiner

*Primary Examiner* — Cheng-Yuan Tseng
(74) *Attorney, Agent, or Firm* — Canon U.S.A., Inc. IP Division

(57) ABSTRACT

A device management apparatus which receives software to be used in an image processing apparatus from a distribution apparatus and redistributes the software to an image processing apparatus includes a first acquisition unit configured to acquire from the image processing apparatus user history information indicating usage history of a user of the image processing apparatus, a second acquisition unit configured to acquire from the distribution apparatus execution instruction information of the software including conditions for executing a process associated with installment of the software, a search unit configured to search for a user satisfying conditions included in execution instruction information acquired by the second acquisition unit based on the user history information acquired by the first acquisition unit, and an instruction unit configured to issue, when a user satisfying conditions included in the execution instruction information is found by the search unit, an execution instruction based on the execution instruction information to an image processing apparatus which is a distribution destination of the software.

11 Claims, 13 Drawing Sheets

FIG.6

| Date/Time | DeviceID | UserID | Function | Operation |
|---|---|---|---|---|
| 2008/1/10/ 15:27:30 | Device1 | UserA | Copy | 2sided, 2on1 |
| 2008/1/10/ 16:00:00 | Device1 | UserA | Copy | |
| 2008/1/10/ 16:30:00 | Device1 | UserB | Fax-Send | 300dpi, B&W |
| 2008/1/10/ 17:00:00 | Device2 | UserB | Box-Print | 2sided, Staple |
| 2008/1/11/ 09:10:20 | Device2 | UserB | Fax-Send | 300dpi, B&W |
| 2008/1/11/ 09:30:12 | Device1 | UserA | Copy | 2sided |
| 2008/1/11/ 10:43:30 | Device1 | UserC | Copy | |
| 2008/1/11/ 11:55:22 | Device2 | UserA | Copy | 2sided |
| 2008/1/11/ 14:03:34 | Device1 | UserC | Box-Scan | 300dpi, FullColor |
| 2008/1/11/ 16:14:33 | Device2 | UserA | Copy | |
| 2008/1/12/ 11:50:25 | Device1 | UserB | Fax-Send | 300dpi, B&W |
| 2008/1/12/ 16:20:00 | Device1 | UserC | Email-Send | 200dpi, B&W |
| . . . | . . . | . . . | . . . | . . . |

FIG.7A 700a  705 706

| ITEM | | DATA |
|---|---|---|
| CONDITION OF APPLICATION | TERM | WITHIN PAST 30 DAYS |
| | FUNCTION | COPY FUNCTION |
| | SETTING | USED |
| APPLICATION TARGET | | USER |
| OPERATION | | DISPLAY MESSAGE |
| ADDITIONAL INFORMATION | | "COPY FUNCTION IS UPDATED. COPY-FORGERY-INHIBITED PATTERN PRINTING IS AVAILABLE." |

701 — CONDITION OF APPLICATION
702 — APPLICATION TARGET
703 — OPERATION
704 — ADDITIONAL INFORMATION

FIG.7B 700b  707

| ITEM | | DATA |
|---|---|---|
| CONDITION OF APPLICATION | TERM | EVEN ONCE IN THE PAST |
| | FUNCTION | E-MAIL SEND FUNCTION |
| | SETTING | NOT USED |
| APPLICATION TARGET | | USER |
| OPERATION | | DISPLAY MESSAGE |
| ADDITIONAL INFORMATION | | "CAN EASILY SEND DOCUMENT USING 'SEND TO SENDER' FUNCTION" |

| ITEM | | DATA |
|---|---|---|
| CONDITION OF APPLICATION | TERM | NONE |
| | FUNCTION | NONE |
| | SETTING | NONE |
| APPLICATION TARGET | | ADMINISTRATOR |
| OPERATION | | DISPLAY MESSAGE |
| ADDITIONAL INFORMATION | | "SEND FUNCTION IS UPDATED. PLEASE CHANGE NETWORK SETTING." |

| ITEM | | DATA |
|---|---|---|
| CONDITION OF APPLICATION | TERM | NONE |
| | FUNCTION | NONE |
| | SETTING | NONE |
| APPLICATION TARGET | | DEVICE |
| OPERATION | | MAKE SEND FUNCTION UNAVAILABLE |
| ADDITIONAL INFORMATION | | NONE |

FIG.11

CONDITIONAL INSTRUCTION LIST

| CONDITION NO. 1101 | CONDITION OF APPLICATION 1102 | APPLICATION TARGET 1103 | OPERATION 1104 | FACTOR 1105 |
|---|---|---|---|---|
| 1 | WITHIN PAST 30 DAYS | USER | DISPLAY MESSAGE | COPY FUNCTION IS UPDATED |
|  |  |  |  |  |

1100

1106 EDIT   1107 DELETE   1108 DELETE ALL   1109 OK

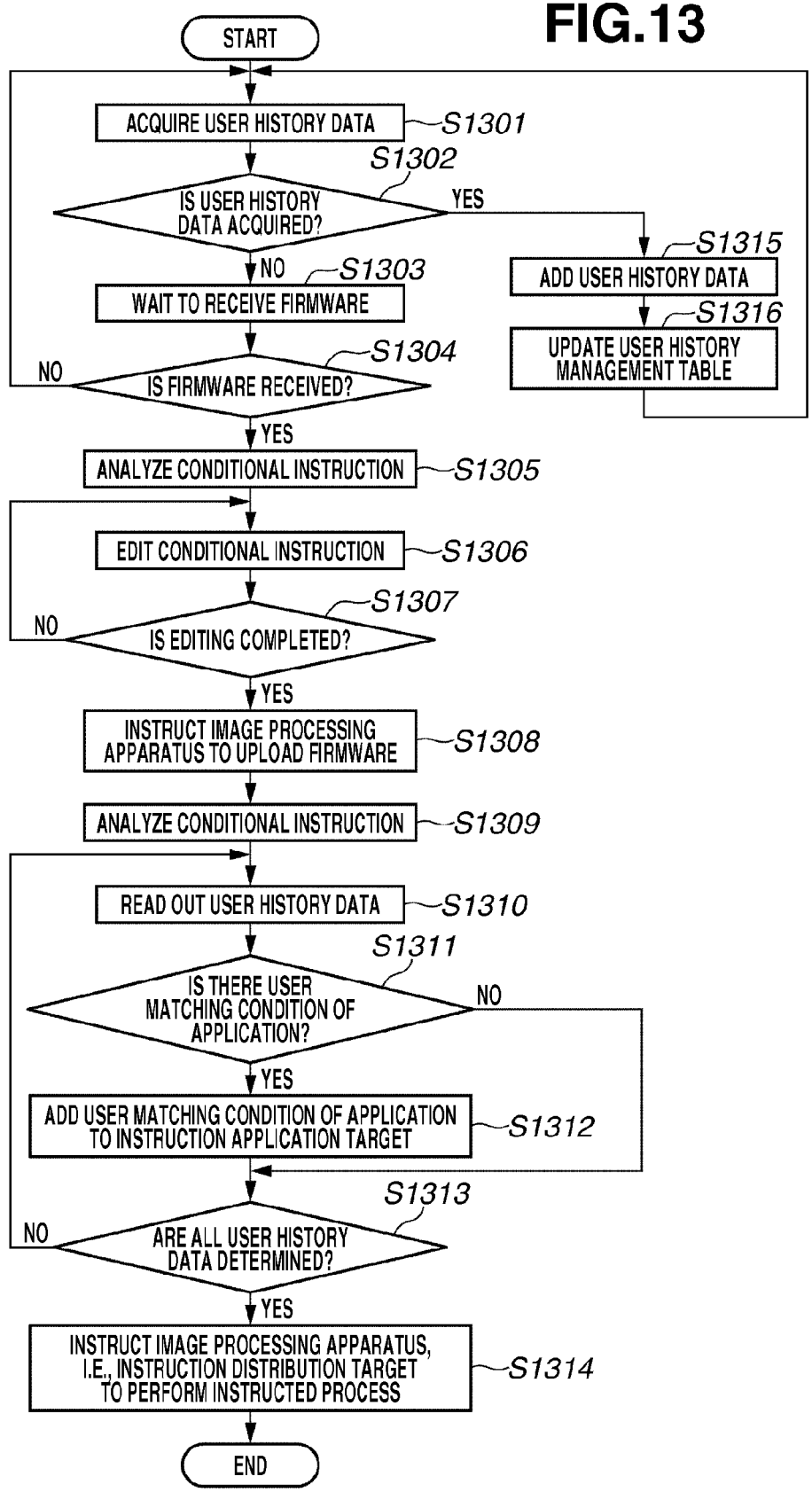

DEVICE MANAGEMENT APPARATUS, DEVICE MANAGEMENT METHOD, AND STORAGE MEDIUM

BACKGROUND OF THE INVENTION

1. Field of the Invention

The present invention relates to a device management apparatus, device management method, and storage medium.

2. Description of the Related Art

In an image processing apparatus (image forming apparatus) such as a copying machine, firmware is updated in a user environment to add a function or correct a flaw in the software.

In such a case, the copying machine downloads the firmware from a distribution server and updates the firmware in each copying machine. Further, a relay distribution server can download the firmware from the distribution server connected via the Internet. The relay distribution server then redistributes the downloaded firmware to copying machines in an office to update the firmware.

After the firmware is uploaded, the copying machine may notify users that the firmware is updated by displaying a message.

In general, a copying machine is used by a plurality of users. However, when the copying machine displays the above-described message after updating the firmware, the same message is displayed to all users.

In contrast, Japanese Patent Application Laid-Open No. 2002-10158 discusses a technique in which commercial message content data to be inserted into television program data is received via the Internet and stored. More specifically, audience profile, such as date of birth, gender, and occupation of the audience, is stored. Television program main data and a commercial message script which describes criteria for replacing a part of the television program main data are then received from the broadcasting station.

By comparing the criteria described in the commercial message script with the audience profile, the commercial message portion included in the television program main data is replaced, and the commercial message is thus displayed. As a result, different data (i.e., commercial message) is displayed for each user.

Further, Japanese Patent Application Laid-Open No. 2001-266247 discusses a technique in which a distribution server selects advertisement data having an advertising effect. The advertisement data is selected based on an advertisement target attribute provided for each advertisement by each advertising provider, and a shop attribute provided by the shop.

The distribution server then distributes to the shop only the data having an advertising value appropriate for the shop, based on the selected result. Therefore, different information (advertisement) can be provided to each user.

SUMMARY OF THE INVENTION

According to an aspect of the present invention, a device management apparatus which receives software to be used in an image processing apparatus from a distribution apparatus and redistributes the software to an image processing apparatus includes a first acquisition unit configured to acquire from the image processing apparatus user history information indicating usage history of a user of the image processing apparatus, a second acquisition unit configured to acquire from the distribution apparatus execution instruction information of the software including conditions for executing a process associated with installment of the software, a search unit configured to search for a user satisfying conditions included in execution instruction information acquired by the second acquisition unit based on the user history information acquired by the first acquisition unit, and an instruction unit configured to issue, when a user satisfying conditions included in the execution instruction information is found by the search unit, an execution instruction based on the execution instruction information to an image processing apparatus which is a distribution destination of the software.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a table illustrating an example of user history data acquired by the device management server from the image processing apparatus according to the first exemplary embodiment of the present invention.

FIGS. 7A, 7B, 7C, and 7D are tables illustrating examples of conditional instructions received by the device management server from a firmware distribution server according to the first exemplary embodiment of the present invention.

FIG. 11 illustrates an example of the operation screen (conditional instruction display dialog) displayed on a display device of the device management server according to a second exemplary embodiment of the present invention.

FIG. 13 is a flowchart illustrating an example of a series of processes performed by the device management server according to the second exemplary embodiment of the present invention.

DETAILED DESCRIPTION OF THE EMBODIMENTS

Various exemplary embodiments, features, and aspects of the invention will be described in detail below with reference to the drawings.

Figure 1:
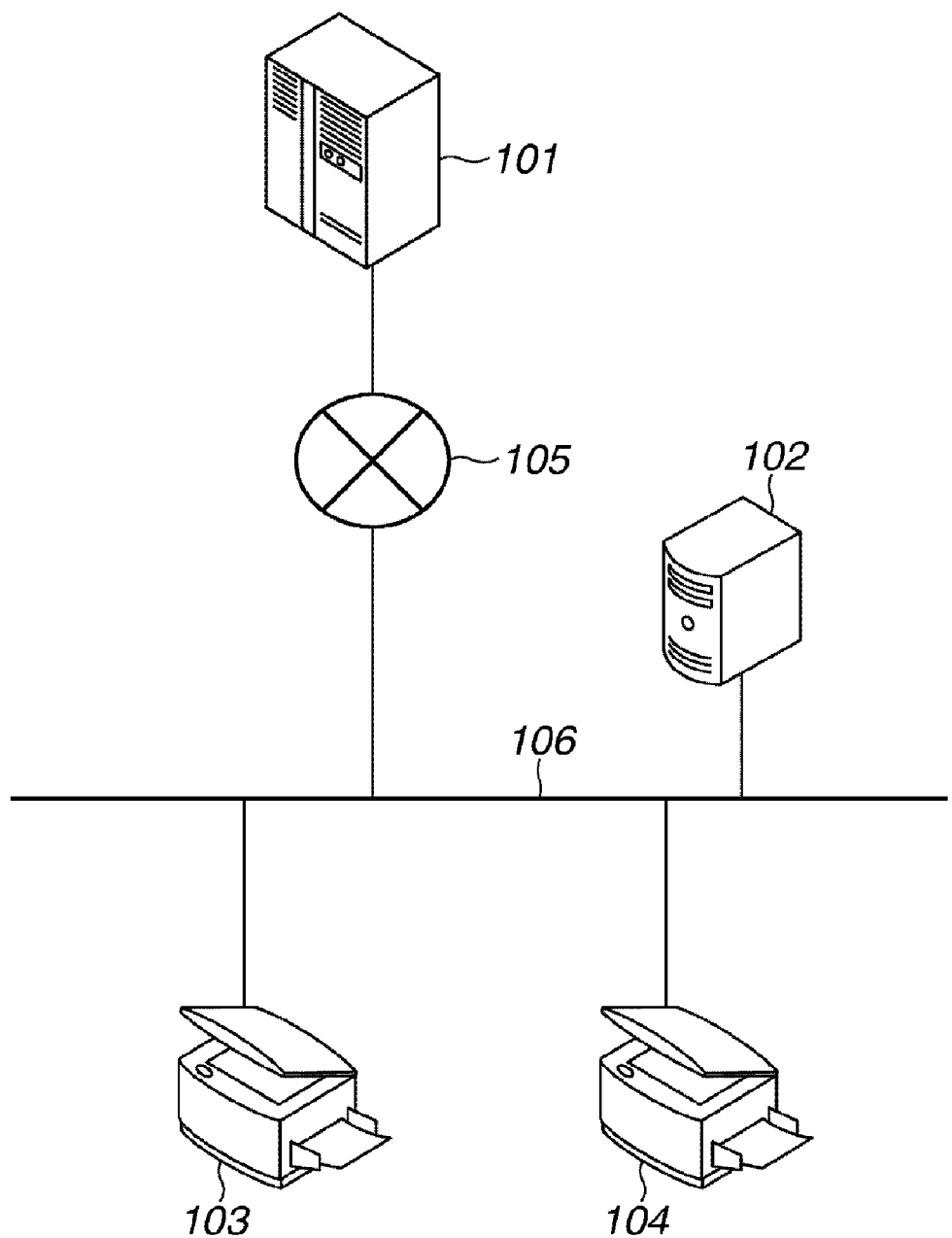
FIG. 1 illustrates an example of a configuration of a software distribution system according to a first exemplary embodiment of the present invention.

The first exemplary embodiment of the present invention will be described below with reference to the drawings. FIG. 1 illustrates an example of a configuration of a software distribution system.

Referring to FIG. 1, a firmware distribution server 101 stores the firmware for image processing apparatuses 103 and 104 and distributes the firmware to a device management server 102. The firmware distribution server 101 is connected to the Internet 105.

The device management server 102 manages the image processing apparatuses 103 and 104. The device management server 102 receives the firmware from the firmware distribution server 101 and redistributes the received firmware to the image processing apparatuses 103 and 104. The device management server 102 then instructs the image processing apparatuses 103 and 104 to update the firmware.

The device management server 102 is connected to a local area network (LAN) 106 connected to the Internet 105. The image processing apparatuses 103 and 104 include a copy function, a print function, a facsimile function, and a function for scanning a paper medium (original document) and storing the scanned result in the apparatus as electronic data.

Further, the image processing apparatuses 103 and 104 transmit the scanned data to other apparatuses in the form of an e-mail. The image processing apparatuses 103 and 104 are also connected to the LAN 106.

As described above, the device management server 102 is connected to the LAN 106 and can transmit via the LAN 106 the firmware to the image processing apparatuses 103 and 104 that are also connected to the LAN 106.

Further, the device management server 102 can acquire from the image processing apparatuses 103 and 104 status information, job history, print count information, user count information and the like of the image processing apparatuses 103 and 104 via the LAN 106.

Further, the device management server 102 can instruct the image processing apparatuses 103 and 104 to display a specific message on operation display panels of the image processing apparatuses 103 and 104.

Further, as described above, the device management server 102 can communicate with the firmware distribution server 101 via the Internet 105. The device management server 102 receives the firmware distributed from the firmware distribution server 101 and acts as a relay station for instructing the image processing apparatuses 103 and 104 to upload the firmware.

In the example illustrated in FIG. 1, two image processing apparatuses 103 and 104 are connected to the LAN 106. However, there can be more than two image processing apparatuses connected to the LAN 106. Further, there can be just one image processing apparatus connected to the LAN 106.

Figure 2:
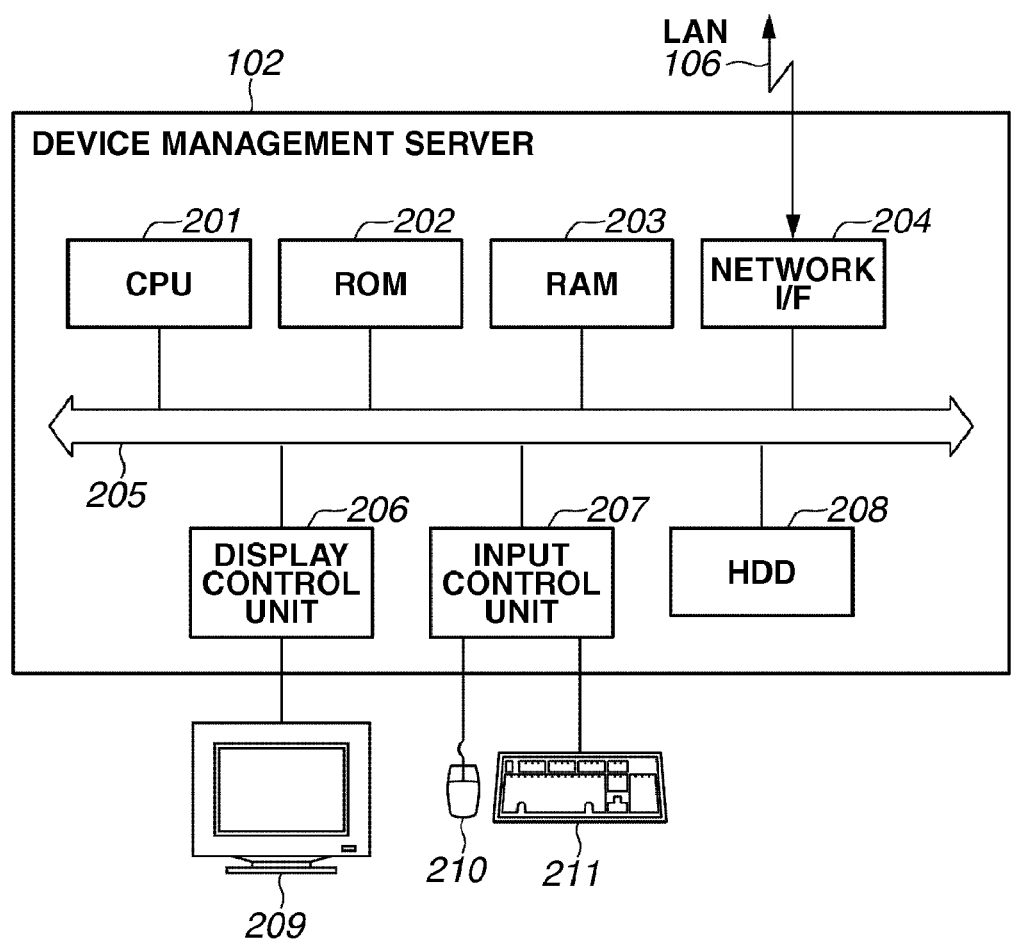
FIG. 2 is a system block diagram illustrating an example of an internal configuration of a device management server according to the first exemplary embodiment of the present invention.

FIG. 2 is a system block diagram illustrating an example of the internal configuration of the device management server 102. Since the internal configuration of the firmware distribution server 101 is similar to the internal configuration of the device management server 102 illustrated in FIG. 2, only the internal configuration of the device management server 102 will be described. The internal configuration of the device management server 102 will thus be omitted.

Referring to FIG. 2, a central processing unit (CPU) 201 is activated based on a boot program stored in a read-only memory (ROM) 202. Further, the CPU 201 controls the entire device management server 102 by reading out a control program stored in a hard disk drive (HDD) 208 or the ROM 202 and performing a predetermined process using a random access memory (RAM) 203 as a work area.

The ROM 202 is a read-only memory for storing the boot program necessary in activating the system and programs executed by the device management server 102. The RAM 203 is a work memory used when the CPU 201 executes a program.

A network interface (I/F) 204 communicates with external devices (e.g., the image processing apparatuses 103 and 104) connected to the LAN 106. Further, the network I/F 204 communicates with external devices (e.g., the firmware device server 101) connected to the Internet 105 via the LAN 106.

The CPU 201, the ROM 202, the RAM 203, the network I/F 204, a display control unit 206, an input control unit 207, and the HDD 208 are connected to a system bus 205 to transmit and receive programs and data between each other.

The display control unit 206 is connected to a display device 209 and can display information such as setting information for the user. The input control unit 207 is connected to input devices such as a mouse 210 and a keyboard 211.

The user managing the device management server 102 confirms the operation status of the device management server 102 and issues operation instructions using the above-described input/output devices.

Figure 3:
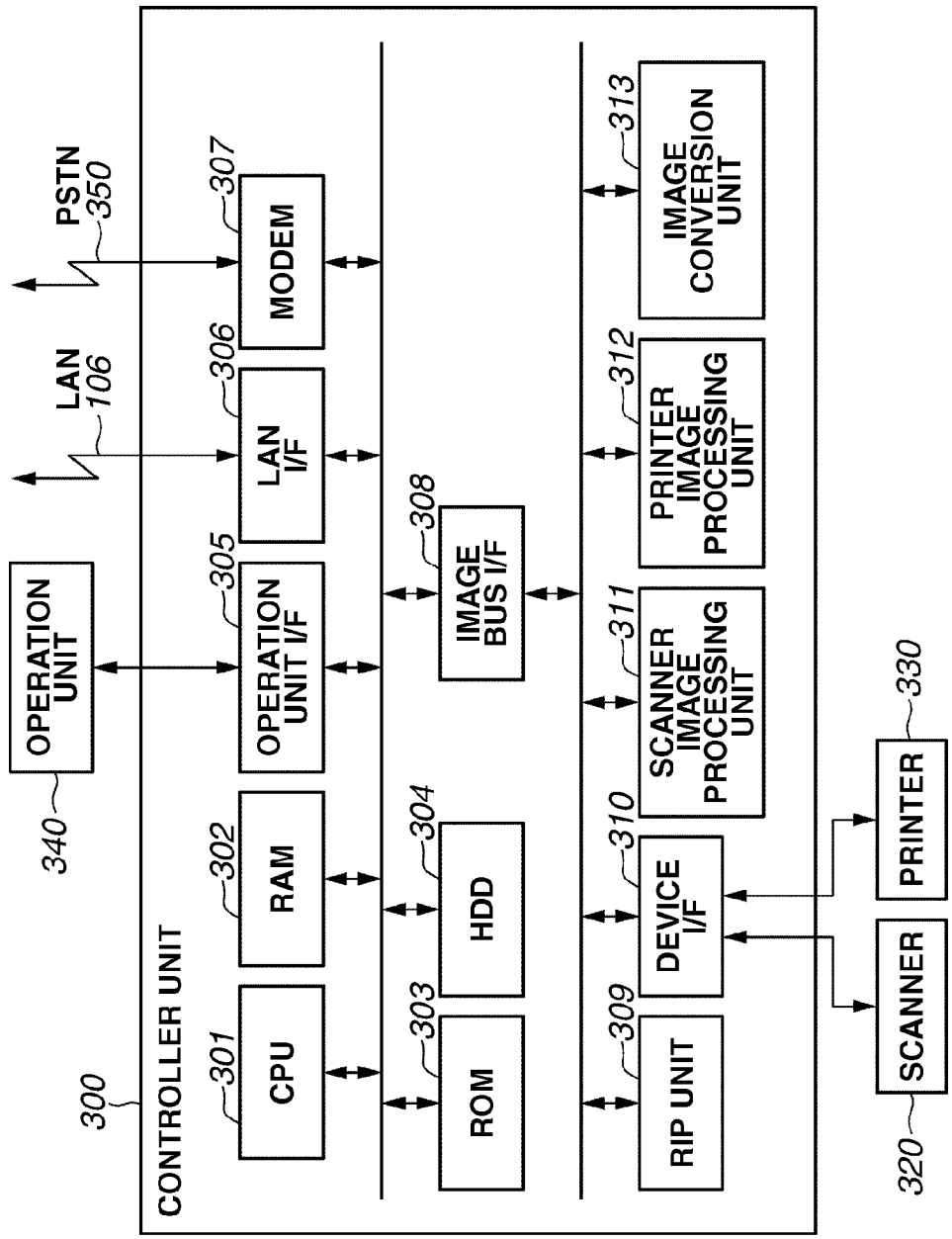
FIG. 3 is a system block diagram illustrating an example of an internal configuration of an image processing apparatus according to the first exemplary embodiment of the present invention.

FIG. 3 is a system block diagram illustrating an example of the internal configurations of the image processing apparatuses 103 and 104.

Referring to FIG. 3, the image processing apparatuses 103 and 104 include a controller unit 300 to which a scanner 320 and a printer 330 are connected. Further, The controller unit 300 is connected to the LAN 106 and a public switched telephone network (PSTN) 350.

The controller unit 300 includes a CPU 301 that executes various control programs. The CPU 301 activates the system based on the boot program stored in a ROM 303. The CPU 301 reads out the control program and the like stored in the HDD 304 and performs a predetermined process using a RAM 302 as a work area.

An HDD 304 stores the various control programs and image data (i.e., document data). Further, the HDD 304 stores data read by the scanner 320 and the document data acquired from an external device via a LAN I/F 306 or a modem 307.

An operation unit I/F 305 is an interface between the controller unit 300 and an operation unit 340 and transfers image data to be displayed on the operation unit 340 to the operation unit 340. The operation unit I/F 305 also transfers to the CPU 301 a signal generated by an operation input to the operation unit 340.

The operation unit 340 includes an input unit which includes a display unit for displaying the current setting status of each function related to image processing and an information input screen for the user to input the setting information of each function. The input unit also includes keys for the user to input the setting information for each function.

The LAN I/F 306 is connected to the LAN 106 and is used to input and output information via the LAN 106. The modem 307 is connected to the PSTN 350 and is used to input and output the information via the PSTN 350.

An image bus I/F 308 is an interface connecting the image bus to the system bus and converts data structures between the image bus and the system bus.

A raster image processing (RIP) unit 309 rasterizes a page description language (PDL) code which is received via the LAN I/F 306 into a bit map image.

A device I/F 310 connects the scanner 320 and the printer 330, i.e., image input/output devices, to the controller unit 300. The device I/F 310 thus performs synchronous/asynchronous conversion of the image data.

A scanner image processing unit 311 corrects, processes, and edits the image data input from the scanner 320. A printer image processing unit 312 performs image correction on the image data to be output to the printer 330. An image conversion unit 313 performs processes such as rotation, resolution correction, and binary-to-multivalued conversion on the image data.

Figure 4:
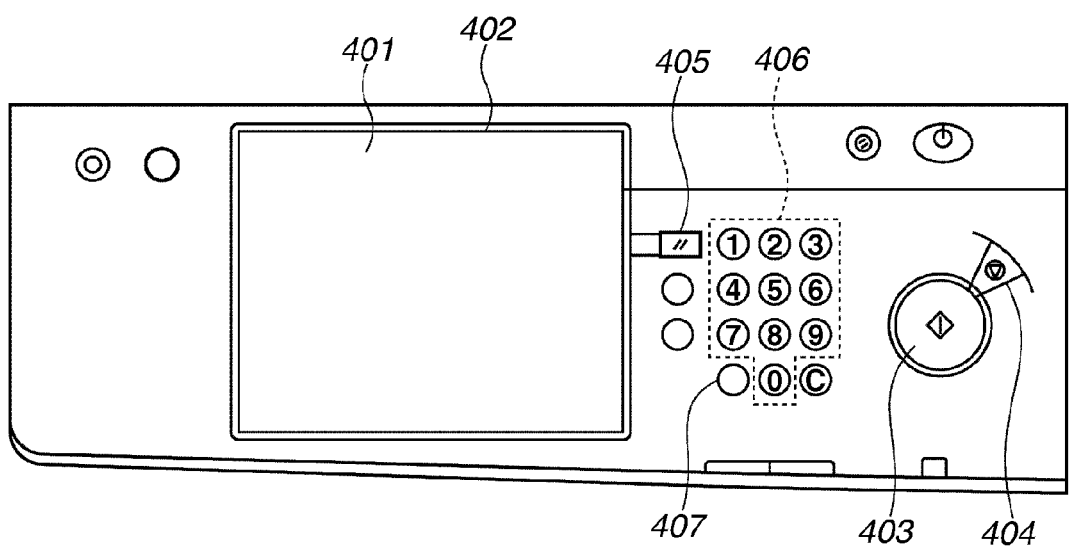
FIG. 4 illustrates an example of an external configuration of an operation unit of the image processing apparatus according to the first exemplary embodiment of the present invention.

FIG. 4 illustrates an example of the external configuration of the operation unit 340 of the image processing apparatuses 103 and 104.

Referring to FIG. 4, an LC operation panel 402 is an LC display (LCD) apparatus including a touch panel sheet 401 attached on the surface. The LC operation panel 402 displays the operation screen for the user to specify various settings and the setting information input by the user.

The user can input various settings by touching the operation screen displayed on the LC operation panel 402 via the touch panel sheet 401. In such a case, the LC operation panel 402 detects position information of the portion touched by the user. The LC operation panel 402 then notifies the CPU 301 via the operation unit I/F 305 of the content of the instruction that corresponds to the position information.

A start key 403 is a hard key to be pressed by the user when instructing the scanner 320 to start reading a document or the printer 330 to start printing. A stop key 404 is a hard key for the user to instruct the image processing apparatuses 103 and 104 to deactivate the operation thereof.

A reset key 405 is pressed by the user to instruct clearing current settings and restoring default settings. A numerical keypad 406 is used to input numerical values such as a number of copies. The user presses an identification (ID) key 407 after inputting a user ID and a password to log into the image processing apparatuses 103 and 104.

Figure 5:
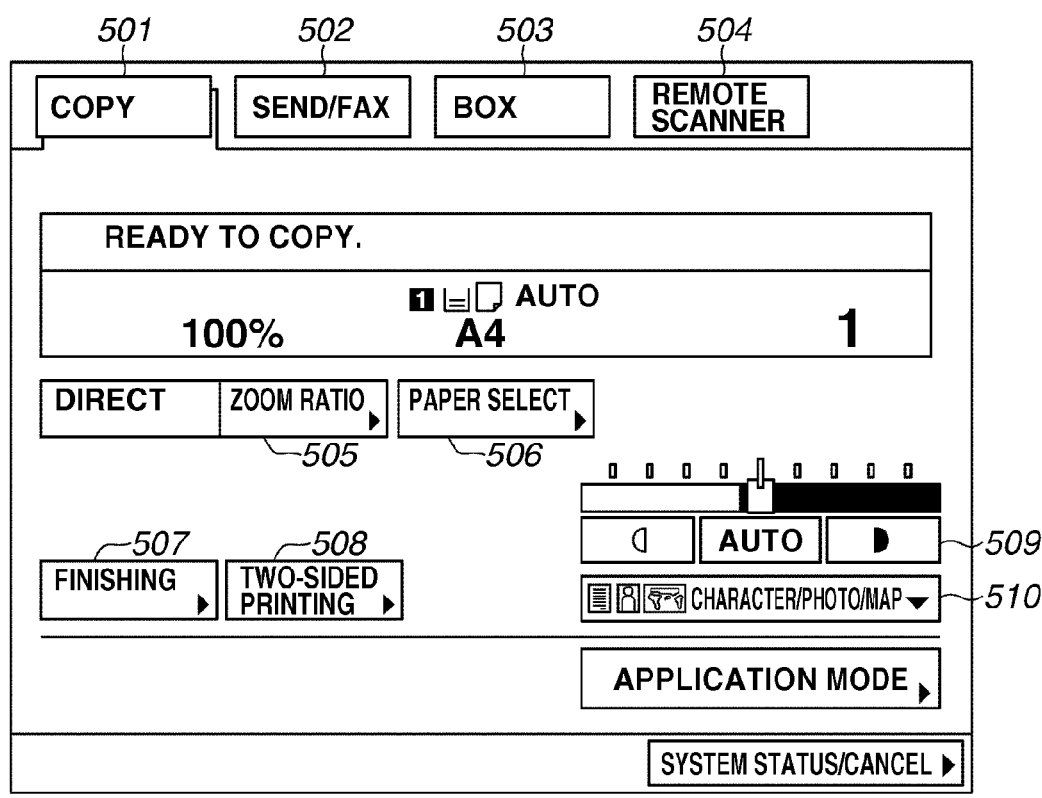
FIG. 5 illustrates an example of an operation screen displayed on a liquid crystal (LC) operation panel of the image processing apparatus according to the first exemplary embodiment of the present invention.

FIG. 5 illustrates an example of the operation screen displayed on the LC operation panel 402 of the image processing apparatuses 103 and 104.

According to the present exemplary embodiment, the image processing apparatuses 103 and 104 include four modes, i.e., a copy mode, a send mode, a box mode, and a scanner mode.

In the copy mode, a copy operation is performed by the scanner 320. The scanner 320 reads and inputs the image data of the document, and the printer 330 prints the input image data.

In the send mode, the image data input from the scanner 320 or previously stored in the HDD 304 is send to a destination (i.e., an external device) via the LAN 106 or the Internet 105. The image data is sent, for example, by e-mail.

In the box mode, the image data stored in the box is processed (i.e., edited, printed, or transmitted). The box is a storage area, for example, in a memory area of the HDD 304, allocated to each user for storing the image data.

In the scanner mode, the image data input from the scanner 320 is stored in the box or transmitted to an external device via the LAN 106.

When the user selects one of the mode buttons 501, 502, 503, and 504 illustrated in FIG. 5, the mode can be switched to one of the above-described modes. The example in FIG. 5 illustrates a copy mode screen displayed as a default screen when the image processing apparatuses 103 and 104 are switched on. The user uses buttons 505, 506, 507, 508, 509, and 510 in the copy mode screen to select a zoom ratio, output paper size, and discharge paper type, and specify two-sided/one-sided printing, density, and image quality mode.

FIG. 6 is a table illustrating an example of user history data that the device management server 102 acquires from the image processing apparatus 103 and 104.

For example, the device management server 102 can regularly acquire the user history data and the status information of the image processing apparatuses 103 and 104 from the image processing apparatuses 103 and 104. The device management server 102 then stores the acquired user history data in a user history management table 600 stored in the HDD 208 of the device management server 102.

Referring to FIG. 6, the user history data includes date/time data ("Date/Time") 601, image processing apparatus ID ("Device ID") 602, and user ID ("User ID") 603. Further, the user history data includes used function data ("Function") 604 and setting value data ("Operation") 605.

The date/time data 601 indicates the date and time the user performed an operation on the image processing apparatus 103 and 104.

The image processing apparatus ID 602 is data for identifying the image processing apparatus connected to the LAN 106. By referring to the image processing apparatus ID 602, the device management server 102 can determine the image processing apparatus used by the user.

The user ID 603 is data for identifying the user who operated on the image processing apparatuses 103 and 104.

In the present exemplary embodiment, the image processing apparatuses 103 and 104 manages users (user-management) or department (department-management). Therefore, the user is required to input a user ID or a password using certain means before operating on the image processing apparatuses 103 and 104. The device management server 102 then identifies the user who has used the image processing apparatus or a group to which the user belongs based on the input user ID or the password and acquires the data of the identified user or group.

Further, in the present exemplary embodiment, the device management server 102 acquires the user ID and the password input to the image processing apparatuses 103 and 104. The device management server 102 then compares the acquired user ID and password with the user information previously registered in the device management server 102 and determines whether to allow the user to log in.

The used function data 604 indicates the function used by the user in the image processing apparatuses 103 and 104. As described above, the image processing apparatuses 103 and 104 in the present exemplary embodiment include four modes, and the device management server 102 acquires the data of the mode used by the user.

In the example illustrated in FIG. 6, the facsimile transmission using the PSTN 350 (Fax-Send) and transmission using a network such as e-mail (Email-Send) are separately described in the send mode. Further, storing the data scanned by the scanner 320 in the box (Box-Scan) and printing the data stored in the box by the printer 330 (Box-Print) are separately described in the box mode.

The setting value data 605 indicates the function used by the user in the image processing apparatuses 103 and 104. By referring to the setting value data 605, the device management server 102 can determine the setting that the user has specified to the function indicated by the used function data 604.

The first line of the data described in the table illustrated in FIG. 6 indicates that, at 15:27:30 on Jan. 10, 2008, User A used the copy function in Device 1 image processing apparatus. Moreover, the corresponding setting value is two-on-one two-sided printing.

The device management server 102 acquires such data from each of the image processing apparatuses 103 and 104 and stores the acquired data in the HDD 208.

Further, the device management server 102 can sort and count or search each user history data described in the user history management table 600, for example, based on each date and time, apparatus, user, and used function. As a result, the device management server 102 can search by combining a number of conditions, e.g., "user having used the copy function within the past 10 days" or "user having used Device 1 at a specific time and date".

FIGS. 7A, 7B, 7C, and 7D are tables illustrating examples of conditional instructions that the device management server 102 receives from the firmware distribution server 101. For example, the firmware distribution server 101 distributes to the device management server 102 one of conditional instructions 700a, 700b, 700c, and 700d illustrated in FIGS. 7A, 7B, 7C, and 7D, together with the updating firmware.

The conditional instructions 700a, 700b, 700c, and 700d describe items to be performed by the image processing apparatus of which the firmware is updated when the image processing apparatus satisfies a specific condition. The conditional instructions 700a, 700b, 700c, and 700d have the same configuration, and the only difference is the specified condition or the content of the process performed when the specified condition is satisfied. More specifically, in the present exemplary embodiment, the conditional instructions 700a, 700b, 700c, and 700d each include a condition of application 701, an application target 702, an operation 703, and additional information 704.

The condition of application 701 describes conditions for the image processing apparatus of which the firmware is uploaded to perform the process specified in the operation 703. The condition of application 701 further includes a term condition 705, a function condition 706, and a setting condition 707 to describe the conditions for the image processing apparatus to perform the above-described process.

In the term condition 705, date, period, or history of performing a specific process or using a function is specified. In the function condition 706, the type of the process or function, or the setting information of the process or function is specified.

In the setting condition 707, whether the condition is matched when the process or function specified in the function condition 707 is used or not used is specified. As a result, the device management server 102 can determine that a condition is matched when the user has not used a specific function.

The application target 702 indicates a target on which the operation 703 is performed when there is a subject that matches all of the condition of application 701. In the present exemplary embodiment, the user or the image processing apparatus is designated as the application target 702. Further, in the present exemplary embodiment, when the user is designated as the application target 702, either a general user or an administrator having specific authority is designated.

The operation 703 describes a content of the process to be actually performed on the application target 702 when there is a user or an image processing apparatus matching all of the condition of application 701. In the present exemplary embodiment, an instruction to display a message or a warning on the LC operation panel 402 of the image processing apparatus, or an instruction that causes a specific function to be unavailable is designated in the operation 703.

The additional information 704 describes information that complements the operation 703. If the instruction designated in the operation 703 is to display a message, the actual content of the message is designated in the additional information 704.

It is not necessary to designate the condition of application 701 if it is not necessary to specify the application target. When the condition of application 701 is not designated, the operation 703 is executed on all application targets 702.

The device management server 102 receives the firmware and the conditional instruction 700 from the firmware distribution server 101 via the Internet 105. The device management server 102 then distributes the received firmware to the image processing apparatuses 103 and 104 connected to the LAN 106 and instructs the image processing apparatuses 103 and 104 to update the firmware.

Further, the device management server 102 analyzes the content of the received conditional instruction 700 and searches for the user who matches the condition of application 701 using the user history management table 600 previously stored in the HDD 208.

If the application target 702 is the image processing apparatus (i.e., "device" indicated in FIG. 7D) as a result of analyzing the content of the received conditional instruction 700, the device management server 102 determines that it is not necessary to perform a search using the user history management table 600.

If there is a user matching the condition of application 701 indicated in the conditional instruction 700 or an image processing apparatus indicated as the application target 702 in the conditional instruction 700, the device management server 102 performs the process described below.

More specifically, the device management server 102 transmits the contents of the operation 703 and the additional information 704 indicated in the conditional instruction 700 to the image processing apparatuses 103 and 104. The device management server 102 thus instructs the image processing apparatuses 103 and 104 to perform the process designated in the operation 703.

For example, the conditional instruction 700a illustrated in FIG. 7A specifies displaying the following message to the user who has used the copy function within the past 30 days: "The copy function is updated. Copy-forgery-inhibited pattern printing is available."

In such a case, the user who has used the copy function within the past 30 days is the application target 702. As a result, if the firmware is uploaded in January 2008, User A and User C can be identified as users that match the condition of application 701 (i.e., the application target 702) referring to the user history management table 600 illustrated in FIG. 6.

The device management server 102 then instructs the image processing apparatuses 103 and 104 to display the above-described message when User A or User C logs in.

By receiving such an instruction, the image processing apparatuses 103 and 104 display the designated message on the LC operation panel 402 when User A or User C logs into the image processing apparatuses 103 and 104.

Figure 8:
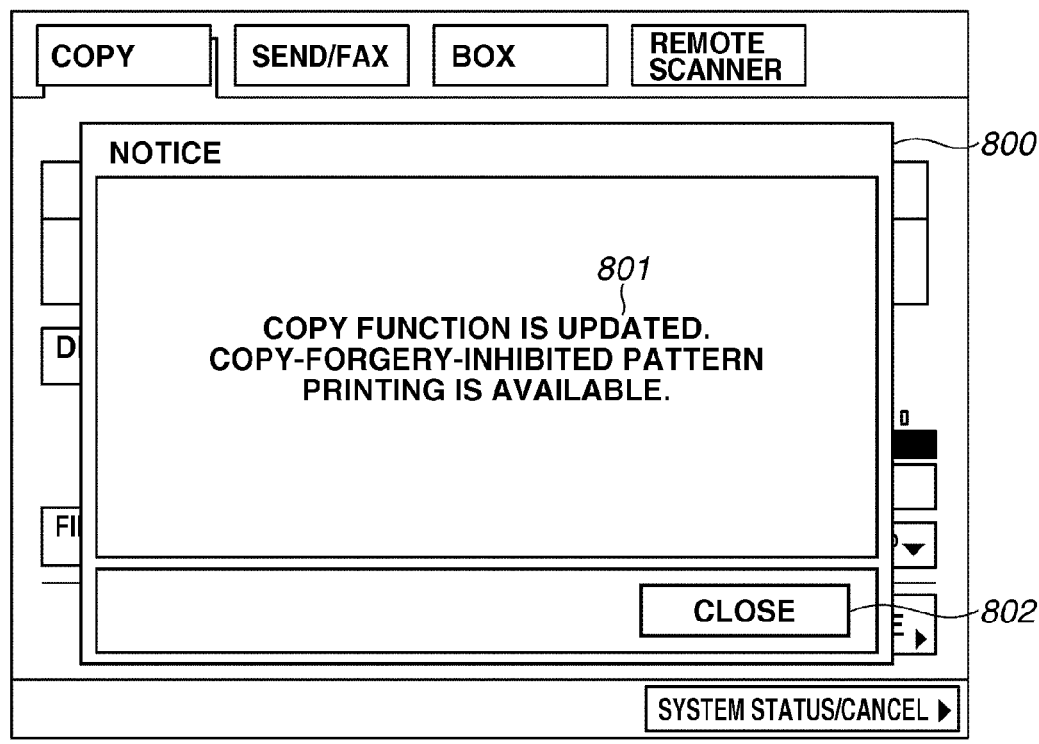
FIG. 8 illustrates an example of the operation screen displayed on the LC operation panel of the image processing apparatus after an operation according to the conditional instruction is executed according to the first exemplary embodiment of the present invention.

FIG. 8 illustrates an example of the operation screen displayed on the LC operation panel 402 of the image processing apparatuses 103 and 104 after the operation 703 indicated in the conditional instruction 700a is performed.

Referring to FIG. 8, a message dialog 800 displays the message instructed by the device management server 102 on the operation screen. If User A logs in, the image processing apparatuses 103 and 104 display the message dialog 800 according to the instruction from the device management server 102.

A message 801 is instructed from the device management server 102 and is of the same content as the additional information 704 in the conditional instruction 700. A close button 802 is used to close the message dialog 800.

As described above, when the firmware is updated, a specific message associated with the updating of the firmware can be displayed only to the user who has used the updated function.

In such a case, the message 801 is not displayed to the user who has not used the function (the copy function in the example illustrated in FIG. 8) for a predetermined period. Therefore, such a user who has not used the function for a predetermined period can use the image processing apparatuses 103 and 104 without being interrupted by the message 801.

The conditional instruction 700b illustrated in FIG. 7B sets a conditional instruction to display a message "A document can be easily send by using 'send to sender function'" to the user who has not used an e-mail send function in the past.

In such a case, the user who has not used the e-mail send function in the past may be the application target 702. Referring to the user history management table 600 illustrated in FIG. 6, it can be determined that User A and User B are users that match the condition of application 701 (i.e., the application target 702).

The device management server 102 then instructs the image processing apparatuses 103 and 104 to display the message "A document can be easily send by using 'send to sender function'" when User A or User B logs in.

As a result, by receiving the above-described instruction, the image processing apparatuses 103 and 104 display the designated message on the LC operation panel 402 when User A or User B logs into the image processing apparatuses 103 and 104.

In the above-described case, a specific message associated with the updating of the firmware can be displayed only to the user who has not used the specific function. Therefore, when the firmware is updated, an addition or a correction of a function can be broadly notified to users who have not used the function to prompt the users to use the function.

The conditional instruction 700c illustrated in FIG. 7C sets a conditional instruction to display the following message to the administrator: "The send function has been updated. Please change the network settings." More specifically, it is not necessary to designate the condition of application 701 including the term condition 705, the function condition 706, and the setting condition 707.

In the above-described case, the image processing apparatuses 103 and 104 can be instructed to display the message on the LC operation panel 402 only when the user having logged into the image processing apparatuses 103 and 104 is the administrator.

As a result, if it is necessary to change the settings of the image processing apparatus or perform a specific process when the firmware is updated, the message can be displayed only to the user who has the authority to perform such setting change and specific process.

Therefore, a user without having the authority to change the settings or perform the specific process can use the image processing apparatuses 103 and 104 without being interrupted by such a message.

In the conditional instruction 700d illustrated in FIG. 7D, a conditional instruction to the image processing apparatus itself to make the send function unavailable is set.

In such a case, the send function in the image processing apparatuses 103 and 104 becomes unavailable to all users, regardless of whether the image processing apparatuses 103 and 104 perform user-management. More specifically, the send mode button 502 illustrated in FIG. 5 becomes invalid for all users, and the send function in the image processing apparatuses 103 and 104 thus become unavailable.

As a result, if a specific function in the image processing apparatus becomes temporarily unavailable or is purposely prohibited when the firmware is updated, the function can be made unavailable to the users.

Figure 9:
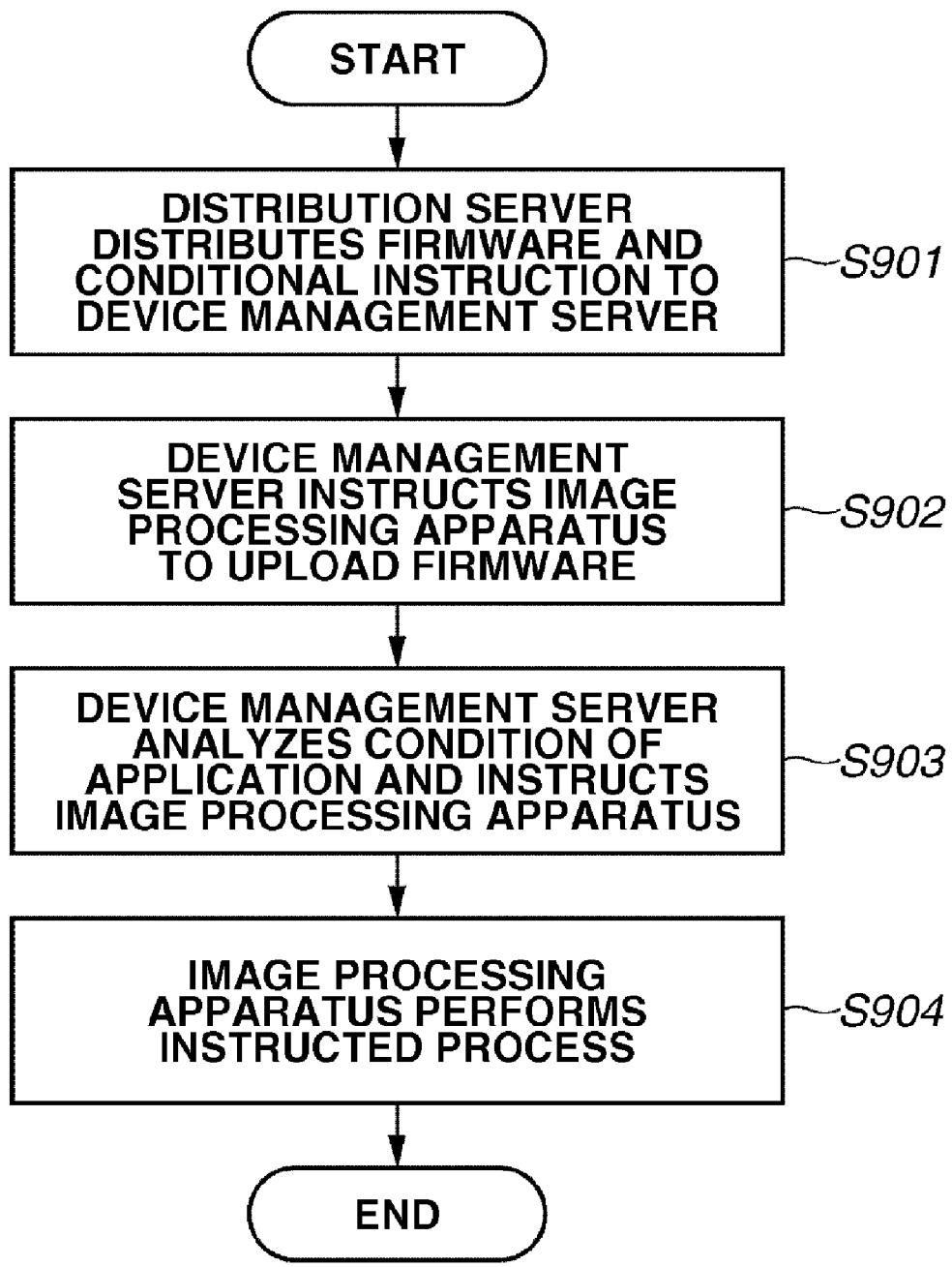
FIG. 9 is a flowchart illustrating an example of a series of processes performed by the firmware distribution system according to the first exemplary embodiment of the present invention.

FIG. 9 is a flowchart illustrating an example of a series of processes performed in the firmware distribution system according to the present exemplary embodiment. More specifically, the flowchart in FIG. 9 illustrates processes from the distribution of the firmware and the conditional instruction 700 by the firmware distribution server 101 to the execution of the distributed conditional instruction 700 by the image processing apparatuses 103 and 104.

In step S901, the firmware distribution server 101 distributes the firmware and the conditional instruction 700 to the device management server 102 via the Internet 105.

In step S902, the device management server 102 distributes the received firmware to the image processing apparatuses 103 and 104 and instructs updating of the firmware.

In step S903, the device management server 102 analyzes the received conditional instruction 700. The device management server 102 then refers to the user history management table 600 as necessary and identifies the application target that matches the conditional instruction 700. The device management server 102 instructs the image processing apparatuses 103 and 104 to perform the process specified in the operation 703 on the application target that matches the conditional instruction 700.

In step S904, the image processing apparatuses 103 and 104 execute the process described in the operation 703 according to the content of the instruction received from the device management server 102. The process illustrated in the flowchart of FIG. 9 then ends.

An example of a process performed in the device management server 102 will be described in detail below.

Figure 10:
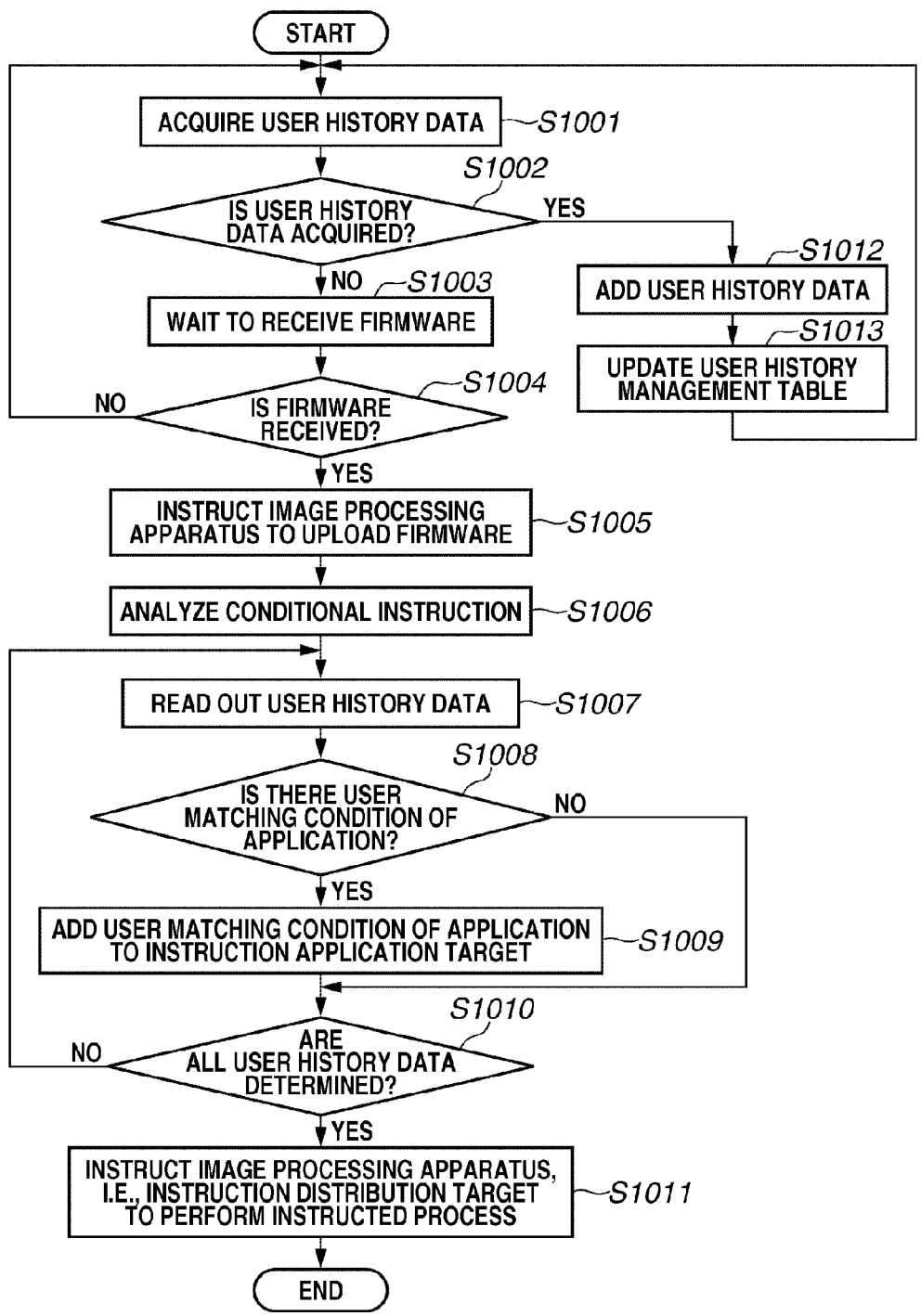
FIG. 10 is a flowchart illustrating an example of a series of processes performed by the device management server according to the first exemplary embodiment of the present invention.

FIG. 10 is a flowchart illustrating an example of a series of processes performed in the device management server 102. More specifically, FIG. 10 is a flowchart illustrating processes performed in step S902 and step S903 of the flowchart illustrated in FIG. 9 in detail.

The processes illustrated in FIG. 10 is executed by the CPU 201 reading out programs stored in the ROM 202 or the HDD 208 of the device management server 102.

In step S1001, the device management server 102 acquires the user history data from the image processing apparatuses 103 and 104.

The device management server 102 can regularly acquire the user history data from the image processing apparatuses 103 and 104. The device management server 102 can also acquire the user history data when the image processing apparatuses 103 and 104 notify the device management server 102 that the user history data has been changed.

In step S1002, the device management server 102 determines whether the user history data is acquired. If the device server 102 determines that the user history data is acquired (YES in step S1002), the process proceeds to step S1012.

In step S1012, the device management server 102 adds the acquired user history data to the user history management table 600. Further, in step S1013, the device management server 102 stores (updates) the user history management table 600, and the process then returns to step S1001.

As described above, according to the present exemplary embodiment, an example of the user history information is realized by the user history data, and an example of the first acquisition unit is realized by performing the process of step S1002.

On the other hand, if it is determined that the user history data is not acquired in step S1002 (NO in step S1002), the process proceeds to step S1003.

In step S1003, the device management server 102 waits to receive the firmware and the conditional instruction 700 from the firmware distribution server 101.

In step S1004, the device management server 102 determines whether the firmware and the conditional instruction 700 are received from the firmware distribution server 101. If the device management server 102 determines that the firmware and the conditional instruction 700 are not received (NO in step S1004), the process returns to step S1001.

On the other hand, if the device management server 102 determines that the firmware and the conditional instruction 700 are received (YES in step S1004), the process proceeds to step S1005. In step S1005, the device management server 102 instructs the image processing apparatuses 103 and 104 to upload the firmware.

Further, the device management server 102 checks the appropriate machine type for the firmware and the version of the firmware. Based on the check result, the device management server 102 then distributes the firmware to the image processing apparatus that can upload the firmware, among the image processing apparatuses connected on the LAN 106 and managed by the device management server 102.

As described above, according to the present exemplary embodiment, an example of the distribution apparatus is realized by the distribution server, an example of the software is realized by the firmware, and an example of the execution instruction information is realized by the conditional instruction 700. Further, an example of the second acquisition unit is realized by performing the processes of step S1003 and step S1004.

In step S1006, the device management server 102 analyzes the content of the conditional instruction 700 distributed at the same time as the firmware.

In step S1007, the device management server 102 reads out one user history data included in the user history management table 600 stored in the HDD 208.

In step S1008, the device management server 102 compares the user history data read out in step S1007 with the conditional instruction 700 analyzed in step S1006. The device management server 102 then determines whether there is a user who matches the condition of application 701 in the condition instruction 700 based on the comparison result.

If it is determined that there is no user matching the condition of application 701 (NO in step S1008), the process proceeds to step S1010 by skipping step S1009.

On the other hand, if there is a user who matches the condition of application 701 (YES in step S1008), the process proceeds to step S1009. In step S1009, the device management server 102 adds the user to the instruction distribution application target.

In step S1010, the device management server 102 determines whether the analyzed conditional instruction 700 has been compared to all user history data included in the user history management table 600 to determine whether there is a user matching the condition of application 701.

If the determination whether the user matches the condition of application 701 has not been performed for all user history data included in the user history management table 600 (NO in step S1010), the process returns to step S1007. In step S1007, the device management server 102 reds out from the user history management table 600 the user history data registered subsequent to the previously read user history data.

As described above, according to the present exemplary embodiment, the user history data is read one by one from the top of the user history management table 600. However, the method of reading the user history data is not limited to this.

On the other hand, if it is determined that the determination whether the user matches the condition of application 701 has been performed for all user history data included in the user history management table 600 (YES in step S1010), the process proceeds to step S1011.

In step S1011, the device management server 102 determines whether the user added to the instruction distribution application target has been able to log into the image processing apparatus that has received the firmware in step S1005.

When the user added to the instruction distribution application target logs into the image processing apparatus which received the firmware, the device management server 102 instructs the image processing apparatus to perform the process according to the conditional instruction 700 analyzed in step S1006.

More specifically, the device management server 102 transmits the contents of the operation 703 and the additional information 704 included in the conditional instruction 700 to the image processing apparatus. The process illustrated in the flowchart of FIG. 10 then ends.

As described above, according to the present exemplary embodiment, the search unit is realized by performing the processes of step S1007, step S1008, step S1009, and step S1010. Further, an example of the instruction unit is realized by performing the process of step S1011.

In the flowchart illustrated in FIG. 10, the application target 702 only includes users. However, if either the user or the image processing apparatus is designated as the application target, the process described below is performed between step S1006 and step S1007.

More specifically, the device management server 102 determines whether the application target 702 of the conditional instruction 700 is a device (image processing apparatus) based on the analysis result of step S1006.

As a result of the determination, if the application target 702 of the conditional instruction 700 is a device (image processing apparatus), the image processing apparatus is added to the instruction distribution application target. The process then proceeds to step S1011 by skipping steps S1007, S1008, S1009, and S1010.

On the other hand, if the application target 702 of the conditional instruction 700 is not a device (image processing apparatus), the process proceeds to step S1007.

As described above, according to the present exemplary embodiment, the firmware distribution server 101 transmits the conditional instruction 700 together with the firmware to the device management server 102 via the Internet 105. The conditional instruction 700 includes the conditions for the image processing apparatus to perform the process associated with the installment of the firmware, and the content of the process.

Further, the device management server 102 acquires from the image processing apparatuses 103 and 104 the user history data describing the usage history of the user in the image processing apparatuses 103 and 104. The device management server 102 then searches for the user matching the conditions included in the conditional instruction 700 in the user history management table 600.

When there is a user matching the conditions included in the conditional instruction 700, the device management server 102 instructs the image processing apparatus into which the user has logged to perform the process included in the conditional instruction 700.

Therefore, the process, such as displaying a message when the firmware is installed, can be changed according to the usage of each user of the image processing apparatus.

As a result, for example, a specific message can be displayed only to the user often using the function in the image processing apparatus that has been changed by the firmware distribution, or to the user particularly related to the changed function. Convenience for the user is thus improved.

Further, a specific message can be displayed only to the user who has not used the function changed by the firmware distribution, so that the user is prompted to use the function.

Further, the administrator of the firmware distribution server 101 can freely change the content of the conditional instruction 700. As a result, the content of the conditional function 700 can be set according to the usage or a rule of the organization or group using the image processing apparatus.

Further, it is not necessary for the firmware distribution server 101, i.e., the firmware distribution source, to manage each user, so that the load on the firmware distribution server 101 or the network can be reduced. Moreover, since personal information is not transmitted over the Internet 105, confidentiality in terms of security can be improved.

As described above, according to the present exemplary embodiment, a process to be executed by the image processing apparatus when the firmware is installed can be appropriately instructed to the image processing apparatus without increasing the load on the image processing apparatus.

The present exemplary embodiment describes an example in which the device management server 102 instructs the image processing apparatus to perform the content of the operation 703 in the conditional instruction 700 after the user logs into the image processing apparatus. However, it is not always necessary to follow the above-described procedure.

For example, the device management server 102 associates the user information and the instruction information that instructs execution of the content of the operation 703 in the conditional instruction 700. The device management server 102 can then transmits the instruction information and the user information to one or a plurality of the appropriate image processing apparatuses. The image processing apparatus stores the received information, and when the image processing apparatus confirms that the user has logged in, the image processing apparatus performs the process according to the instruction information associated with the information about the user.

Further, in the present exemplary embodiment, the firmware distribution server 101 distributes to the device management server 102 the firmware together with the conditional instruction 700 related to the firmware. However, it is not always necessary, and the firmware distribution server 101 can separately distribute the firmware and the conditional instruction 700 related to the firmware.

In such a case, the information for associating the firmware with the conditional instruction 700 related to the firmware is added to at least either of the firmware or the conditional instruction 700.

The second exemplary embodiment will be described below. In addition to the content of the above-described first exemplary embodiment, the user who is the administrator of the device management server 102 can freely change the content of the conditional instruction 700 distributed by the firmware distribution server 101 in the present exemplary embodiment.

As a result, the administrator managing the image processing apparatuses 103 and 104 can change the content of the conditional instruction 700 according to the type of usage and the usage status of the image processing apparatuses 103 and 104.

As described above, in addition to the above-described first exemplary embodiment, the present exemplary embodiment allows changing the content of the conditional instruction 700 in the device management server 102 side. Therefore, portions similar to the first exemplary embodiment will be assigned the same reference numbers as in FIGS. 1, 2, 3, 4, 5, 6, 7, 8, 9, and 10, and detailed description will be omitted.

FIG. 11 illustrates an example of the operation screen (conditional instruction display dialog) displayed on the display device 209 of the device management server 102.

Referring to FIG. 11, a conditional instruction display dialog 1100 is displayed when the device management server 102 receives the conditional instruction 700 from the firmware distribution server 101. The user, i.e., the administrator of the device management server 102, can then confirm the content of the conditional instruction 700 distributed from the firmware distribution server 101 based on the content displayed on the conditional instruction display dialog 1100.

A condition number 1101 indicates information for uniquely identifying the conditional instruction. The condition number 1101 is a number assigned to distinguish, when the device management server 102 receives a plurality of firmware and the conditional instruction 700 from the firmware distribution server 101, the firmware and the conditional instruction 700.

A condition of application 1102, an application target 1102, an operation 1104, and a factor 1105 each indicate information about the condition of application 701, the application target 702, the operation 703, and the additional information 704 in the conditional instruction 700 respectively.

The button 1106 is pressed by the user to open a dialog for editing the conditional instruction currently selected in the conditional instruction display dialog 1100. A button 1107 is pressed to delete the conditional instruction currently selected in the conditional instruction display dialog 1100.

A button 1108 is pressed to delete all conditional instructions displayed in the conditional instruction display dialog 1100. A button 1109 is pressed to close the dialog after confirming the content of the conditional instruction display dialog 1100.

Figure 12:
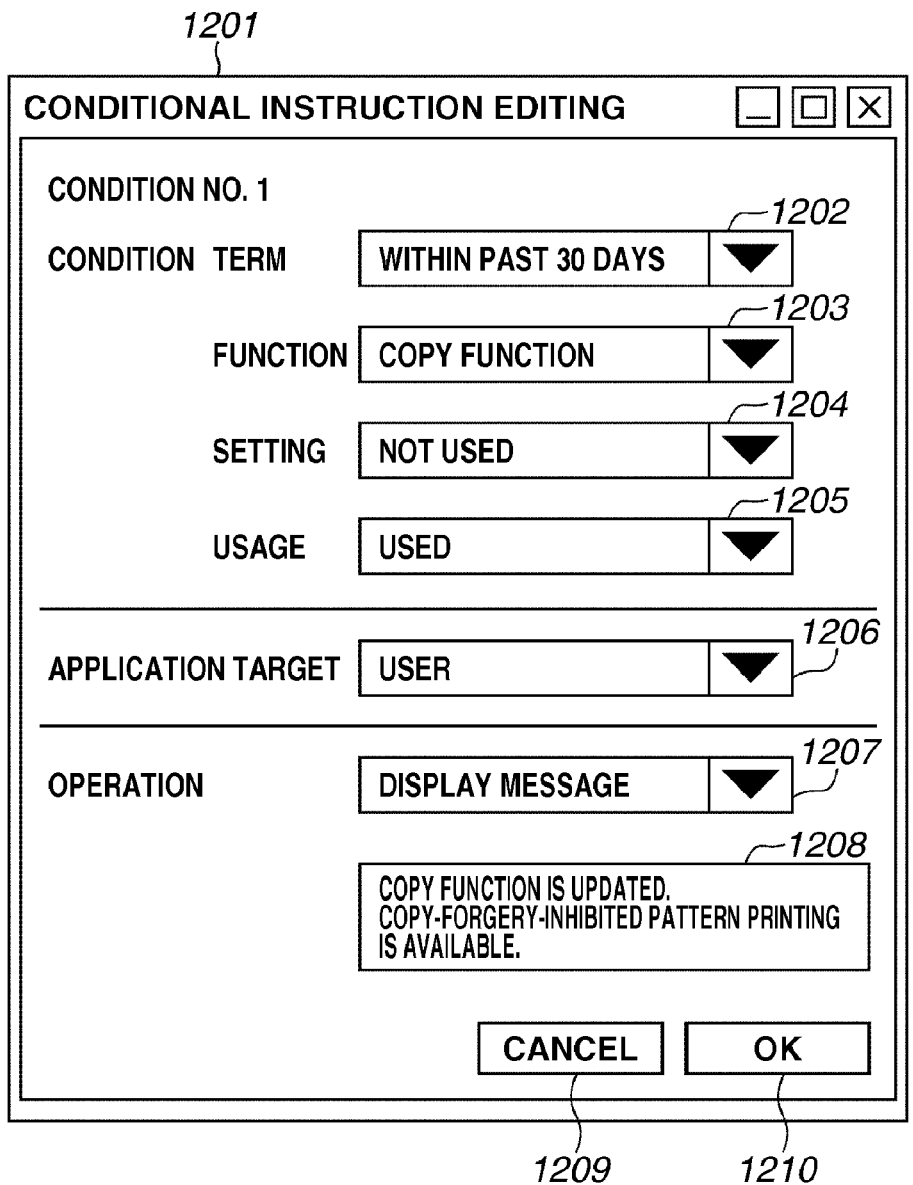
FIG. 12 illustrates an example of the operation screen (conditional instruction edit dialog) displayed on the display device of the device management server when a user presses a conditional instruction edit button in the conditional instruction dialog according to the second exemplary embodiment of the present invention.

FIG. 12 illustrates an example of the operation screen (a conditional instruction edit dialog) displayed on the display device 209 of the device management server 102 when the user presses the button 1106 (i.e., a conditional instruction edit button) in the conditional instruction display dialog 1100 illustrated in FIG. 11.

Referring to FIG. 12, a conditional instruction edit dialog 1201 is a dialog used by the user to edit the conditional instruction.

A button 1202 is pressed by the user to designate the term condition in the condition of application. When the user presses the button 1202, items for instructing the term condition in the condition of application is displayed, so that the user can select an item from among the displayed items.

In the example illustrated in FIG. 12, the condition "within the past 30 days" is designated. However, conditions such as "within the past 7 days" or "once in the past" can also be designated.

A button 1203 is pressed to designate a function condition in the condition of application. When the user presses the button 1203, items for instructing the function condition in the condition of application are displayed, so that the user can select an item from the displayed items.

In the example illustrated in FIG. 12, "copy function" is set. However, "fax transmission function" and "box print function" which are functions of the image processing apparatus can also be designated.

A button 1204 is pressed to designate the setting condition in the condition of application. When the user presses the button 1204, items for specifying the content of the setting of the function condition in the condition of application are displayed. The user can then select one item from the displayed items.

The contents of the items displayed by pressing the button 1204 depend on the function selected by pressing the button 1203. In the example illustrated in FIG. 12, "not designate" is set. However, since "copy function" is selected in the button 1203, "two-sided printing" or "reduced-size layout" can also be designated.

A button 1205 is pressed to designate a usage status of the function condition in the condition of application. When the user presses the button 1205, items are displayed for designating whether the function is used or not used as the condition of application. The user can then select one of the items.

In the example illustrated in FIG. 12, "used" is set. However, "not used" can also be set. More specifically, if the user designates "not used", a case where the function specified using the button 1204 is not used is designated by the user as the condition of application.

A button 1206 is pressed to designate the application target 702 of the conditional instruction. When the user presses the button 1206, items for designating the application target of the condition of application are displayed, so that the user can then select one of the items.

In the example illustrated in FIG. 12, "user" is set using the button 1206. However, "administrator", "general user", or "device" can also be designated.

A button 1207 is pressed to designate the operation 703 in the conditional instruction. When the user presses the button 1207, items for designating the operation 703 in the condition of application are displayed. The user can then select one of the items.

In the example illustrated in FIG. 12, "display message" is set by using the button 1207. However, "not allow use of copy function" and the like can also be designated.

An additional information designation field 1208 is a field for the user to designate the additional information 704 in the conditional instruction. By directly editing characters in a display area of the additional information designation field 1208, the user can designate words of the message in the operation 703. Depending on the designated content of the button 1207, it is not always necessary to set the additional information field 1208.

Further, it is not always necessary to set the instructions using the buttons 1202, 1203, 1204, 1205, and 1206, and "not designate" all items can be set. Further, a part of the instruction can be set using the buttons 1202, 1203, 1204, 1205, and 1206.

A cancel button 1209 is pressed when deleting the content edited in the conditional instruction edit dialog 1201 and closing the conditional instruction edit dialog 1201.

An OK button 1210 is pressed to reflect the content edited in the conditional instruction edit dialog 1201 to the conditional instruction 700 and closing the conditional instruction edit dialog 1201.

FIG. 13 is a flowchart illustrating an example of a series of processes performed by the device management server 102. Similarly as in FIG. 10 in the first exemplary embodiment, the flowchart illustrated in FIG. 13 also describes in detail the processes of step S902 and step S903 in the flowchart illustrated in FIG. 9.

Further, the process illustrated in FIG. 13 can be performed by the CPU 201 reading out programs stored in the ROM 202 or the HDD 208 in the device management server 102. The difference from the first exemplary embodiment (illustrated in FIG. 10) will be described in detail below.

Processes of step S1301, step S1302, step S1303, and step S1304 are similar to the processes performed in step S1001 to step S1004 illustrated in the flowchart of FIG. 10.

In step S1305, the device management server 102 analyzes the content of the conditional instruction 700 received from the firmware distribution server 101 at the same time as the firmware. The process is thus similar to the process performed in step S1006 in FIG. 10.

In step S1306, the device management server 102 edits the conditional instruction 700. As described above, in step S1306, the device management server 102 displays the content of the conditional instruction 700 on the conditional instruction display dialog 1100. The device management server 102 then waits for the edit instruction from the user who is the administrator of the device management server 102. The user thus edits the conditional instruction 700 in the conditional instruction edit dialog 1201.

In step S1307, the device management server 102 determines whether the user has completed editing. More specifically, the device management server 102 determines whether the user pressed the button 1109 in the conditional instruction display dialog 1100 and confirmed the edited content.

If it is determined that the user has not completed editing (NO in step S1307), the process returns to step S1306. The processes of step S1306 and step S1307 are then repeated until the user completes editing.

On the other hand, if the user has completed editing (YES in step S1307), then, the process proceeds to step S1308. In step S1308, the device management server 102 instructs the image processing apparatuses 103 and 104 to upload the firmware. The process performed in step S1308 is thus similar to the process performed in step S1005 illustrated in the flowchart of FIG. 10.

The processes performed in step S1309 to step S1316 are similar to the processes performed in step S1006 to step S1013 illustrated in the flowchart of FIG. 10. However, if the conditional instruction is edited and changed, the conditional instruction in step S1309 to step S1316 may be the changed conditional instruction.

As described above, according to the present exemplary embodiment, an example of the first acquisition unit is realized by performing the process of step S1302. Further, an example of the second acquisition unit is realized by performing the processes of step S1303 and step S1304.

Further, an example of a changing unit is realized by performing the processes of step S1306 and step S1307, and an example of the search unit is realized by performing the processes of step S1310 to step S1313. Further, an example of the instruction unit is realized by performing the process of step S1314.

As described above, according to the present exemplary embodiment, the content of the conditional instruction 700 can be changed in the device management server 102 side. As a result, instructions that reflect the intentions of the administrator of the device management server 102 who manages the image processing apparatus can be issued to the image processing apparatus, in addition to achieving the effect described in the first exemplary embodiment.

The timing at which the content of the conditional instruction 700 is changed in the device management server 102 side is not limited to the timing illustrated in FIG. 13, if it is located between timing of receiving the conditional instruction 700 and timing of analyzing the conditional instruction 700.

Further, the present exemplary embodiment can be applied to various modified examples as described in the first exemplary embodiment.

According to the present exemplary embodiment, the user matching the condition for performing the process associated with the installment of the software is searched based on the user history information indicating the user history. The image processing apparatus to which the software is distributed is instructed to perform the process.

As a result, the image processing apparatus can be instructed as appropriate to perform the process associated with the installment of the software without imposing a heavy load on the image processing apparatus.

Each of the units configuring the distribution apparatus and each step in the distribution method according to the exemplary embodiment of the present invention can also be achieved by executing a software (program code) stored in a RAM or a ROM in a computer. The software (program code) and the computer-readable storage medium may thus constitute the present invention.

The present invention can be embodied as a system, apparatus, method, program or a storage medium. More specifically, the present invention can be applied to a system including a plurality of devices or to an apparatus of a single device.

The present invention can also be achieved by providing software (program code) for implementing functions of the above-described exemplary embodiments (programs that correspond to flowcharts illustrated in FIGS. 9, 10, and 13 according to the exemplary embodiment) directly or remotely to a system or an apparatus. The software (program code) can be read and executed by a computer of the system or the apparatus.

The software (program code) itself, installed in the computer for implementing functional processes of the present invention on the computer, realizes the present invention. More specifically, the software (program code) realizing the functional processes of the present invention may thus constitute the present invention.

Software to implement the above-mentioned exemplary embodiments can take any form readable by computer, for example, an object code, a program executed by an interpreter, or script data to be supplied to an operating system (OS).

The storage medium can be, for example, a floppy disk, a hard disk, an optical disk, a magneto-optical (MO) disk, a compact disc ROM (CD-ROM), a CD-recordable (CD-R), a CD-rewritable (CD-RW), a magnetic tape, a nonvolatile memory card, a ROM, or a digital versatile disc (DVD, DVD-ROM, and DVD-R).

Such software (program code) can also be supplied by accessing a web page on the Internet through the browser of a client computer. The software (program code) itself or a compressed file including an auto-install function can be downloaded from the web page onto a storage medium such as a hard disk.

The present invention can also be achieved by dividing the software (program code) into a plurality of files and downloading each file from a different web page. More specifically, a world-wide web (WWW) server from which a plurality of users downloads the program files for realizing the functional processes of the present invention constitutes the present invention.

The present invention can also be achieved by delivering to users a program of the present invention that is encrypted and stored in a computer readable storage medium such as a CD-ROM. Then, decryption key information that solves an encryption is downloaded from a website to the user who meets certain requirements via the Internet. Then, the present invention can be realized by executing an encrypted program using the key information to install it on a computer.

Furthermore, the above-described exemplary embodiments can be realized by executing software (program code) read by a computer. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing according to the instructions of the software (program code) to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-172805 filed Jul. 1, 2008, which is hereby incorporated by reference herein in its entirety.

What is claimed is:

1. A device management apparatus which receives software to be used in an image processing apparatus from a distribution apparatus and redistributes the software to an image processing apparatus, the device management apparatus comprising:
  a first acquisition unit configured to acquire from the image processing apparatus user history information indicating usage history of a user of the image processing apparatus;
  a second acquisition unit configured to acquire from the distribution apparatus execution instruction information of the software including conditions for executing a process associated with installment of the software;
  a search unit configured to search for a user satisfying conditions included in execution instruction information acquired by the second acquisition unit based on the user history information acquired by the first acquisition unit; and
  an instruction unit configured to issue, when a user satisfying conditions included in the execution instruction information is found by the search unit, an execution instruction based on the execution instruction information to an image processing apparatus which is a distribution destination of the software.

2. The device management apparatus according to claim 1, further comprising a changing unit configured to change a content of execution instruction information acquired by the second acquisition unit based on a user instruction,
> wherein the search unit searches, when the changing unit changes the execution instruction information, for a user satisfying a condition included in the changed execution instruction information, and
>
> wherein the instruction unit issues, when a user satisfying a condition included in execution instruction information change by the changing unit is found by the search unit, an execution instruction based on the changed execution instruction.

3. The device management apparatus according to claim 1, wherein the instruction unit issues, when it is confirmed that a user satisfying a condition included in the execution instruction information has logged into an image processing apparatus which is a distribution destination of the software, an execution instruction based on the execution instruction information to the image processing apparatus.

4. The device management apparatus according to claim 1, wherein the execution instruction includes an instruction to display a message.

5. The device management apparatus according to claim 1, wherein the second acquisition unit acquires the execution instruction information about the software along with the software.

6. A device management method for receiving software to be used in an image processing apparatus from a distribution apparatus and redistributing the software to an image processing apparatus, the device management method comprising:
> acquiring from the image processing apparatus user history information indicating usage history of a user of the image processing apparatus;
>
> acquiring from the distribution apparatus execution instruction information of the software including conditions for executing a process associated with installment of the software;
>
> searching for a user satisfying conditions included in the acquired execution instruction information based on the acquired user history information; and
>
> issuing, when a user satisfying conditions included in the execution instruction information is found by the search unit, an execution instruction based on the execution instruction information to an image processing apparatus which is a distribution destination of the software.

7. The device management method according to claim 6, further comprising:
> changing a content of the acquired execution instruction information based on a user instruction;
>
> searching, when the execution instruction information is changed, for a user satisfying a condition included in the changed execution instruction information; and
>
> issuing, when a user satisfying a condition included in the changed execution instruction information is found, an execution instruction based on the changed execution instruction.

8. The device management method according to claim 6, further comprising issuing, when it is confirmed that a user satisfying a condition included in the execution instruction information has logged into an image processing apparatus which is a distribution destination of the software, an execution instruction based on the execution instruction information to the image processing apparatus.

9. The device management method according to claim 6, wherein the execution instruction includes an instruction to display a message.

10. The device management method according to claim 6, further comprising acquiring the execution instruction information about the software along with the software.

11. A computer-readable storage medium storing computer executable instructions for controlling a computer to execute a device management method according to claim 6.

* * * * *